United States Patent Office 3,091,575
Patented May 28, 1963

3,091,575
METHOD OF PREPARING Δ¹ STEROIDS
Louis I. Feldman, Spring Valley, and Chester E. Holmlund, Pearl River, N.Y., and Norma L. Barbacci, Montvale, N.J., assignors to American Cyanamid Company, New York, N.Y., a corporation of Maine
No Drawing. Filed June 6, 1961, Ser. No. 115,094
20 Claims. (Cl. 195—51)

This invention relates to a new process of preparing steroids. More particularly, it relates to a method of inhibiting the destruction of steroids in microbial systems.

In biochemical reactions involving the use of microorganisms to accomplish steroid transformations, it is known that destruction of the desired steroid can take place giving lower yields or sometimes no product. This phenomenon may be described as "destructase" activity and is manifested by the simultaneous loss of 240 m$\mu$ absorption (due to the Δ⁴-3-ketone) and blue tetrazolium reactivity (due to an $\alpha$ ketol) in compounds containing these groupings. The loss of these properties is probably not the result of minor alterations brought about by reduction, isomerization or side-chain oxidation since independent methods to detect these changes have failed to reveal their occurrence. Thus the "destructase" system, at the least, simultaneously attacks both the "A" ring and the side-chain, and the reactions involved may be considerably more profound. "Destructase" activity is very wide-spread among biological systems and has been observed with great frequency in microbiological systems. Microbial systems manifesting "destructase" activity have been of great variety and have not been limited to 1,2-dehydrogenating systems. Thus "destructase" activity is a serious side reaction which results in a greatly decreased yield of steroid. With certain steroids and certain microorganisms steroid destruction is so rapid and complete that no steroids can be isolated.

We have now found that the destruction of the desired steroid can be all but eliminated by the use of inhibitors. For example, when 1,2-dehydrogenating organisms are grown under normal fermentation conditions and at the time of steroid addition, a member of either of two classes of compounds is introduced into the mash. The introduction of these additives causes inhibition of "destructase" activity resulting in a significantly higher yield of the desired 1,2-dehydro steroid. The classes of compounds inhibiting "destructase" activity are of the quinonoid type or are compounds containing an atom of subgroup VI of the periodic table.

The inhibition of destructase activity appears to be a general phenomenon manifested by quinonoid type compounds. Among the quinonoids found to be effective have been quinones, phenazines, thiazines, oxazines, benzenone-indophenols, acridines, xanthylium salts and thioxanthylium salts. Furthermore, the oxidized and reduced forms appear equally effective since identical results are obtained when either hydroquinone or p-benzoquinone is used.

The inhibition of "destructase" activity appears to be manifested generally by compounds containing atoms of subgroup VI of the periodic table. Among the atoms shown to be effective have been chromium, molybdenum and tungsten. Compounds containing these atoms are, for example, potassium dichromate, chromic nitrate, chromous chloride, chromous sulfide, chromous acetate, chromic oxide, chromic sulfate, chromic phosphate, ferrous chromate, sodium chromate, potassium chromate, sodium dichromate, phosphotungstic acid, sodium tungstate, tungstic dichloride, tungstic tetrochloride, tungstic pentachloride, tungstic dioxide, tungstic trioxide, phosphomolybdic acid, molybdenum disulfide, molybdenum sesquioxide, molybdenum trioxide, molybdenum chloride and sodium molybdate. The effectiveness does not appear to be governed by the ionic species since both $Cr^{+6}$ and $CR^{+3}$ have demonstrated inhibition of "destructase" activity.

The use of elements of subgroup VI of the periodic table is not limited to introduction at the time of steroid addition. Introduction of potassium dichromate into the formulation of the medium prior to sterilization has proven effective and permitted a more convenient and desirable method of inhibiting the "destructase" system.

A study of the ionic forms of compounds containing the atoms of subgroup VI of the periodic table shows that $Cr_2O_7^{-2}$ exists primarily as $CrO_4^{-2}$ under the pH conditions existing in the fermentation mash. Subsequent to sterilization by autoclaving, the greenish cast imparted to the medium is suggestive of the chromic ion ($Cr^{+3}$) which would be anticipated following this treatment. Further evidence in this direction is obtained by a negative lead acetate test for $CrO_4^{-2}$ which demonstrates the absence of $CrO_4^{-2}$. The lead acetate test conducted on mash to which potassium dichromate has been introduced at the time of steroid addition, on the other hand, is positive for $CrO_4^{-2}$. $Cr^{+3}$, in the form of $Cr(NO_3)_3$, introduced at the time of steroid addition also inhibits the "destructase" activity as predicted from the above considerations.

The inhibition of the "destructase" system does not appear to be merely a reflection of the redox potential imparted by the quinonoid compounds or atoms of the subgroup VI of the periodic table, since compounds with both higher and lower redox potentials than members of the two classes of compounds used have failed to demonstrate this inhibition.

In carrying out the process of the present invention to produce 1,2-dehydrogenation, any of the organisms described in the prior art for this purpose can be used. Among these organisms may be mentioned *Nocardia corallina* (ATCC 999), *Corynebacterium simplex* (ATCC 6946), *Mycobacterium rhodochrous* (ATCC 12674), *Bacterium cyclooxydans* (ATCC 12673) and *Bacterium mycoides* (Lederle Culture No. 327). The cultivation and growing of these microorganisms in suitable media is described in the prior art such as United States Patents 2,822,318; 2,837,464 and the like. These media comprise essentially a source of carbon, assimilable nitrogen and trace elements. As pointed out above, the addition of the claimed inhibitors preferably takes place at the time the steroid is added to the media although it can take place at the time of sterilizing the media. The amount of inhibitor to be added will, to some extent, depend on the steroid, microorganism, media and the state of the particular organism in a given fermentation. The amount of inhibitor added will vary from about $2.0 \times 10^{-6}$ to $2.0 \times 10^{-1}$ molar. Following completion of the reaction, the desired steroid is recovered in the usual manner well known in the steroid art.

The process of the present invention is useful in preparing Δ¹ steroids, such as, for example triamcinolone, prednisolone, prednisone and almost any steroid having a Δ¹ double bond in the final product. The process of preparing compounds, such as described in United States Patents 2,789,118; 2,822,318, etc. is greatly improved by the use of the inhibitors of the present invention.

The following examples describe in detail the results obtained with different inhibitors, various microorganisms and steroids for varying lengths of time.

*Example I*

The group of organisms below are washed aseptically from trypticase soy agar slants (Baltimore Biological Laboratory) with sterile water into 100 ml. of sterile medium contained in a 500 ml. Erlenmeyer flask. The flasks are incubated on a reciprocating shaker at a prescribed temperature for a predetermined time. The time, temperature and medium utilized for each organism is shown in the following table:

| Organism | Time (hrs.) | Temp. (° C.) | Medium |
|---|---|---|---|
| Nocardia corallina (ATCC 999) | 7 | 37 | A [1] |
| Corynebacterium simplex (ATCC 6946) | 7 | 33 | B [2] |
| Mycobacterium rhodochrous (ATCC 12,674) | 7 | 33 | A |
| Bacterium cyclooxydans (ATCC 12,673) | 7 | 33 | B |
| Bacterium mycoides (Lederle Culture 327) | 7 | 33 | A |

[1] Medium A consists of 0.4% beef extract, 0.1% yeast extract, 0.4% peptone, 1.0% glucose, 0.25% sodium chloride, pH adjusted to 7.0.
[2] Medium B consists of 0.1% yeast extract, 0.245% potassium dihydrogen phosphate, 0.256% disodium phosphate.

Following the inoculum development described above, 1.0 ml. of inoculum is introduced into 100 ml. of the same sterile medium, used for the inoculum development, in a 500 ml. Erlenmeyer flask. The flasks are incubated on a reciprocating shaker for 16 hours at 28° C. At this time, 200 µg./ml. of steroid, dissolved in methanol at a concentration of 10 mg./ml., and the desired quinonoid, or compound containing an atom of subgroup VI of the periodic table, in solution form, are introduced into each flask and the incubation is allowed to continue. At intervals 1.0 ml. aliquots are removed aseptically from the flasks and extracted with 8 ml. of ethyl acetate saturated with water. Aliquots of the ethyl acetate containing approximately 100 µg. of steroid is concentrated in a tube to a dry residue. Samples are chilled in an ice bath and 5 ml. of reagent (kept at 0° C.) added. The reagent is prepared by dissolving 400 mg. of isonicotinic acid hydrazide (Nutritional Biochemicals) per 100 ml. of methanol containing 0.5 ml. concentrated hydrochloric acid. After exactly eight minutes in the ice bath, the optical density of the sample is read at 410 mµ against a reagent blank. The samples and blank are then heated for twenty minutes in a 60° C. water bath, after which the optical densities are again read at 410 mµ. The results were computed as follows:

$a$ = observed O.D. at 0° C. after 8 minutes $b$ = observed O.D. at 60° C. after 20 minutes $$R_1 = \frac{\text{O.D. of standard } \Delta^{1,4}\text{-3-ketosteroid at 0° C.}}{\text{O.D. of standard } \Delta^{1,4}\text{-3-ketosteroid at 60° C.}}$$

$$R_2 = \frac{\text{O.D. of standard } \Delta^4\text{-3-ketosteroid at 60° C.}}{\text{O.D. of standard } \Delta^4\text{-3-ketosteroid at 0° C.}}$$

$Y$ = O.D. of $\Delta^{1,4}$-3-ketosteroid at 60° C. corrected for presence of $\Delta^4$-3-ketosteroid.

$X$ = O.D. of $\Delta^4$-3-ketosteroid at 60° C. corrected for the presence of $\Delta^{1,4}$-3-ketosteroid.

Solving the simultaneous equations:

$$b = X + Y$$

$$a = \frac{X}{R_2} + R_1 Y$$

one obtains:

$$Y = \frac{b - a R_2}{1 - R_1 R_2}$$

and $$X = b - Y$$

For seventeen $\Delta^4$-3-ketosteroids the mean $R_2 = 1.057 \pm .03$ and for eleven $\Delta^4$- and $\Delta^{1,4}$-3-ketosteroid pairs the mean $1 - R_1 R_2 = 0.95 \pm 0.02$. The mean value for these eleven pairs of the ratio $$\frac{\text{O.D. at 60° for } \Delta^{1,4}\text{-3-ketosteroid}}{\text{O.D. at 60° for } \Delta^4\text{-3-ketosteroid}} = 2.06 \pm 0.02$$

The constancy of this ratio permitted the construction of standard curves for $\Delta^{1,4}$-3-ketosteroids (where standards are lacking) based upon the related $\Delta^4$-3-ketosteroid standard curve data. Paper chromatographic assays were also carried out with aliquots equivalent to 50 µg. of steroid.

*Example II*

A reaction is carried out with growing cells of *N. corallina* as described in Example I. Following the preliminary growth period of 16 hours, at the time of addition of hydrocortisone in a separate series of fermentations, the various quinonoid compounds described below are added to the fermentation in sufficient quantity to attain the concentrations indicated. The course of the fermentation during which 1,2-dehydrogenation of hydrocortisone (F) to prednisolone ($\Delta^1$F), and the extent of "destructase" activity can be summarized as follows:

| Quinonoid (molar concentration) | µg. Observed/100 µg. steroid added | | | |
|---|---|---|---|---|
|  | 3 hours | | 24 hours | |
|  | $\Delta^1$F | F | $\Delta^1$F | F |
| No quinonoid added to fermentation | 105 | 3 | 3 | 0 |
| Phenazine methosulfate (3.3×10⁻⁴ M) | 123 | 6 | 123 | 11 |
| 2,6-dichlorobenzenone-indophenol (10⁻³ M) | 83 | 22 | 113 | 19 |
| No quinonoid added to fermentation | 89 | 2 | 2 | 0 |
| Methylene blue (10⁻³ M) | 83 | 5 | 92 | 0 |
| No quinonoid added to fermentation | 46 | 66 | 2 | 0 |
| Gallocyanine (10⁻³ M) | 43 | 75 | 72 | 0 |
| No quinonoid added to fermentation | 94 | 4 | 2 | 0 |
| p-Benzoquinone (10⁻² M) | 86 | 11 | 82 | 2 |

*Example III*

Using the reaction conditions described in Example I, growing cells of *N. corallina* are used to ferment androstenedione, progesterone, Reichstein's Substance S (S) and hydrocortisone (F). Fermentations are carried out in the presence and absence of phenazine methosulfate (PMS) at a concentration of $3.3 \times 10^{-4}$ M.

Conversion to the 1,2-dehydro product ($\Delta^{1,4}$) of each of the above ($\Delta^4$) compounds is summarized as follows:

| Steroid | PMS (molar conc.) | µg. Observed/100 µg. steroid added | | | | | |
|---|---|---|---|---|---|---|---|
|  |  | 1 hour | | 3 hours | | 24 hours | |
|  |  | $\Delta^{1,4}$ | $\Delta^4$ | $\Delta^{1,4}$ | $\Delta^4$ | $\Delta^{1,4}$ | $\Delta^4$ |
| Androstenedione | 0 | 12 | 74 | 32 | 19 | 1 | 1 |
|  | 3.3×10⁻⁴ M | 102 | 3 | 101 | 3 | 99 | 11 |
| Progesterone | 0 | 3 | 83 | 11 | 35 | 2 | 1 |
|  | 3.3×10⁻⁴ M | 103 | 13 | 85 | 4 | 50 | 3 |
| Reichstein's substance S | 0 | 10 | 101 | 22 | 70 | 3 | 0 |
|  | 3.3×10⁻⁴ M | 108 | 7 | 102 | 4 | 77 | 5 |
| Hydrocortisone | 0 | 69 | 59 | 112 | 10 | 3 | 2 |
|  | 3.3×10⁻⁴ M | 107 | 10 | 125 | 6 | 123 | 11 |

*Example IV*

Using the procedure of Example I, growing cells of *N. corallina* are used to ferment hydrocortisone. Fermentations are carried out in the presence of various concentrations of phenazine methosulfate (PMS) which are summarized as follows:

| PMS (molar conc.) | µg. Observed/100 µg. steroid added | | | |
|---|---|---|---|---|
|  | 3 hours | | 24 hours | |
|  | $\Delta^1$F | F | $\Delta^1$F | F |
| 0 | 105 | 3 | 3 | 0 |
| 3.3×10⁻⁵ M | 103 | 2 | 75 | 0 |
| 3.3×10⁻⁴ M | 125 | 6 | 123 | 11 |
| 1×10⁻³ M | 130 | 7 | 130 | 10 |
| 3.3×10⁻³ M | 15 | 85 | 29 | 71 |

*Example V*

Using the procedure described in Example I, hydrocortisone is fermented in the presence and absence of phenazine methosulfate (PMS) by growing cells of *N.* corallina, C. simplex, B. cyclooxydans and B. Mycoides. The results obtained are summarized as follows:

| Organism | PMS | μg. Observed/100 μg. steroid added | | | | | |
|---|---|---|---|---|---|---|---|
| | | 3 hours | | 24 hours | | 96 hours | |
| | | $\Delta^1$ F | F | $\Delta^1$ F | F | $\Delta^1$ F | F |
| Nocardia corallina (ATCC 999) | 0 | 105 | 3 | 3 | 0 | 0 | 0 |
| | $3.3 \times 10^{-4}$ M | 125 | 6 | 123 | 11 | 120 | 0 |
| Corynebacterium simplex (ATCC 6946) | 0 | 64 | 62 | 0 | 0 | 0 | 0 |
| | $3.3 \times 10^{-4}$ M | 15 | 97 | 99 | 14 | 118 | 14 |
| Mycobacterium rhodochrous (ATCC 12674) | 0 | 98 | 3 | 2 | 0 | 0 | 0 |
| | $3.3 \times 10^{-4}$ M | 113 | 16 | 107 | 9 | 103 | 10 |
| Bacterium cyclooxydans (ATCC 12673) | 0 | 110 | 1 | 0 | 0 | 0 | 0 |
| | $3.3 \times 10^{-5}$ M | 102 | 8 | 111 | 0 | 100 | 0 |
| Bacterium mycoides (Lederle Culture 327) | 0 | 93 | 0 | 0 | 0 | 0 | 0 |
| | $3.3 \times 10^{-4}$ M | 109 | 10 | 115 | 10 | 110 | 8 |

*Example VI*

The following reaction is carried out with growing cells of N. corallina as described previously in the procedure of Example I. At the time of steroid addition, the various inorganic compounds shown below are added to the fermentation in sufficient quantity to give the concentrations summarized:

| Supplement (molar concentration) | μg. Observed/100 μg. steroid added | | | |
|---|---|---|---|---|
| | 3 hours | | 24 hours | |
| | $\Delta^1$F | F | $\Delta^1$F | F |
| No inhibitor added to fermentation | 97 | 0 | 4 | 0 |
| $K_2Cr_2O_7$ ($10^{-3}$ M) (potassium dichromate) | 93 | 0 | 94 | 0 |
| No inhibitor added to fermentation | 119 | 4 | 2 | 0 |
| $Cr(NO_3)_3$ ($4 \times 10^{-3}$ M) (chromic nitrate) | 103 | 9 | 112 | 0 |
| No inhibitor added to fermentation | 70 | 8 | 21 | 0 |
| $24WO_3 \cdot P_2O_5 \cdot 25H_2O$ ($10^{-3}$ M) (phosphotungstic acid) | 108 | 15 | 110 | 0 |
| $Na_2WO_4$ ($10^{-3}$ M) (sodium tungstate) | 132 | 15 | 128 | 1 |
| $MO_3 \cdot 2H_3PO_4 \cdot 48H_2O$ ($10^{-3}$ M) (phosphomolybdic acid) | 82 | 23 | 66 | 1 |
| $Na_2MoO_4 \cdot 2H_2O$ ($10^{-3}$ M) (sodium molybdate) | 83 | 16 | 63 | 1 |

*Example VII*

Using the procedure previously described in Example I, except that $10^{-3}$ M potassium dichromate is added to medium A prior to sterilization, N. corallina is grown in medium A containing potassium dichromate. The steroid (hydrocortisone) is added and samples handled as previously described, Example I. Just prior to the time of steroid addition, a lead acetate test is made on the mash. This test is negative, indicating the absence of chromate ion. Furthermore, the mash has a greenish cast suggestive of chromic ion. The results obtained upon steroid assay are described as follows:

| | μg. Observed/100 μg. steroid added | | | |
|---|---|---|---|---|
| | 3 hours | | 24 hours | |
| | $\Delta^1$F | F | $\Delta^1$F | F |
| Medium A | 112 | 9 | 2 | 0 |
| Medium A plus $K_2Cr_2O_7$ ($10^{-3}$ M) | 97 | 0 | 102 | 0 |

*Example VIII*

Using the procedure previously described in Example I, growing cells of N. corallina are used to ferment androstenedione, progesterone, Reichstein's Substance S and hydrocortisone. Fermentations are carried out in the presence and absence of $10^{-3}$ M potassium dichromate introduced into the fermentation at the time of steroid addition. Resuts are as follows:

| Steroid | Potassium dichromate, molar conc. | μg. Observed/100 μg. steroid added | | | | | |
|---|---|---|---|---|---|---|---|
| | | 1 hour | | 3 hours | | 24 hours | |
| | | $\Delta^{1,4}$ | $\Delta^4$ | $\Delta^{1,4}$ | $\Delta^4$ | $\Delta^{1,4}$ | $\Delta^4$ |
| Androstenedione | 0 | 12 | 74 | 32 | 19 | 1 | 1 |
| | $10^{-3}$ M | 10 | 86 | 71 | 34 | 98 | 2 |
| Progesterone | 0 | 3 | 83 | 11 | 35 | 2 | 1 |
| | $10^{-3}$ M | 7 | 95 | 39 | 63 | 83 | 2 |
| S | 0 | 10 | 101 | 22 | 70 | 3 | 0 |
| | $10^{-3}$ M | 9 | 100 | 25 | 73 | 101 | 0 |
| F | 0 | 70 | 32 | 103 | 9 | 3 | 0 |
| | $10^{-3}$ M | 73 | 25 | 99 | 1 | 94 | 0 |

*Example IX*

Using the procedure previously described in Example I, growing cells of N. corallina are used to ferment hydrocortisone. Fermentations are carried out in the presence of the concentrations of potassium dichromate as shown below.

| Potassium dichromate, molar conc. | μg. Observed/100 μg. steroid added | | | | | |
|---|---|---|---|---|---|---|
| | 3 hours | | 24 hours | | 48 hours | |
| | $\Delta^1$F | F | $\Delta^1$F | F | $\Delta^1$F | F |
| 0 | 103 | 9 | 3 | 0 | 0 | 0 |
| $3.3 \times 10^{-4}$ | 93 | 2 | 46 | 0 | 42 | 4 |
| $1 \times 10^{-3}$ | 99 | 1 | 94 | 0 | 97 | 0 |
| $3.3 \times 10^{-3}$ | 97 | 2 | 95 | 0 | 103 | 0 |
| $0.8 \times 10^{-2}$ | 55 | 45 | 64 | 38 | 63 | 41 |
| $1.6 \times 10^{-2}$ | 21 | 72 | 18 | 82 | 20 | 81 |

*Example X*

Using the procedure previously described in Example I, hydrocortisone is fermented in the presence and absence of potassium dichromate by growing cells of N. corallina, C. simplex, M. rhodochrous, B. cyclooxydans and B. mycoides. The results are described as follows:

| Organism | Potassium dichromate, molar conc. | μg. observed/100 μg. steroid added | | | |
|---|---|---|---|---|---|
| | | 3 hours | | 24 hours | |
| | | $\Delta^1$F | F | $\Delta^1$F | F |
| Nocardia corallina (ATCC 999) | 0 | 97 | 0 | 4 | 0 |
| | $10^{-3}$ M | 93 | 0 | 94 | 0 |
| Corynebacterium simplex) (ATCC 6946) | 0 | 54 | 50 | 0 | 0 |
| | $10^{-3}$ M | 10 | 90 | 90 | 2 |
| Mycobacterium rhodochrous (ATCC 12674) | 0 | 98 | 2 | 2 | 0 |
| | $10^{-3}$ M | 100 | 8 | 99 | 0 |
| Bacterium cyclooxydans (ATCC 12673) | 0 | 99 | 1 | 0 | 0 |
| | $10^{-4}$ M | 102 | 3 | 100 | 0 |
| Bacterium mycoides (Lederle Culture 327) | 0 | 93 | 0 | 0 | 0 |
| | $10^{-3}$ M | 99 | 7 | 98 | 0 |

We claim:
1. A method for the improvement of fermentation processes containing a 1,2-dehydrogenating microbial system for the production of 1,2-dehydro steroids in which destruction of $\Delta^{1,4}$-3-keto steroids is inhibited which comprises adding as inhibitors a member selected from the group consisting of compounds containing chromium, molybdenum and tungsten and compounds containing the ortho and para quinonoid structure in the oxidized and reduced state of the formulas:

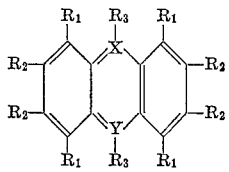

and

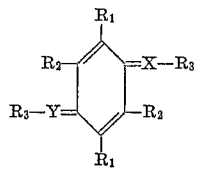

wherein X and Y are atoms selected from the group consisting of oxygen, nitrogen and sulfur, $R_1$ is selected from the group consisting of hydrogen, carboxylic acid, hydroxyl and halogen groups, $R_2$ is selected from the group consisting of hydrogen, hydroxyl and dimethylamino and $R_3$ when present is a member of the group consisting of hydrogen, methyl and p-hydroxyphenyl.

2. A method of inhibiting the destruction of $\Delta^{1,4}$-3-keto steroids in substantially aqueous solution in the presence of 1,2-dehydrogenating microbial systems causing destruction of said steroids which comprises adding to the solution an inhibitor selected from the group consisting of chromium, molybdenum and tungsten compounds.

3. A method of inhibiting the destruction of $\Delta^{1,4}$-3-keto steroids in substantially aqueous solution in the presence of 1,2-dehydrogenating microbial systems causing destruction of said steroids which comprises adding an inhibitor to the solution selected from the group consisting of oxidized and reduced forms of quinones, phenazines, thiazines, oxazines, benzenone-indophenols, acridines, xanthylinium salts and thioxanthylinium salts.

4. In a method of 1,2-dehydrogenating steroids in substantially aqueous solution in the presence of microorganisms capable of 1,2-dehydrogenating said steroids, the improvement which comprises stabilizing the steroids present by the addition of a member selected from the group consisting of chromium compounds, molybdenum compounds and tungsten compounds in an amount to produce from about $2.0 \times 10^{-6}$ to $2.0 \times 10^{-1}$ molar solution.

5. A method of stabilizing $\Delta^{1,4}$-3-one steroids in a fermentation medium in the presence of 1,2-dehydrogenating microorganisms which comprises adding to the said medium a chemical compound of the quinonoid structure selected from the oxidized and reduced forms of the group consisting of quinones, phenazines, thiazines, oxazines, benzenone-indophenols, acridines, xanthylium salts and thioxanythlium salts in a quantity sufficient to produce a concentration of not more than $2.0 \times 10^{-1}$ molar solution.

6. A method of stabilizing $\Delta^1$-hydrocortisone in a fermentation medium in the presence of growing cells of *Nocardia corallina* which comprises adding to the medium potassium dichromate in an amount sufficient to produce from about $2.0 \times 10^{-6}$ to $2.0 \times 10^{-1}$ molar.

7. A method of stabilizing $\Delta^1$-hydrocortisone in a fermentation medium in the presence of growing cells of *Nocardia corallina* which comprises adding to the medium phenazine methosulfate in an amount to produce from about $2.0 \times 10^{-6}$ to $2.0 \times 10^{-1}$ molar.

8. A method in accordance with claim 3 wherein the chemical compound containing the quinonoid structure is phenazine methosulfate.

9. A method in accordance with claim 3 wherein the chemical compound containing the quinonoid structure is p-benzoquinone.

10. A method in accordance with claim 3 wherein the chemical compound containing the quinonoid structure is methylene blue.

11. A method in accordance with claim 3 wherein the chemical compound containing the quinonoid structure is gallocyanine.

12. A method in accordance with claim 3 wherein the chemical compound containing the quinonoid structure is 2,6-dichlorobenzenone-indophenol.

13. A method in accordance with claim 2 wherein the chromium compound is potassium dichromate.

14. A method in accordance with claim 2 wherein the tungsten compound is phosphotungstic acid.

15. A method in accordance with claim 2 wherein the molybdenum compound is sodium molybdate.

16. A method in accordance with claim 5 wherein the compound of the quinonoid structure is gallocyanine and the $\Delta^{1,4}$-3-one steroid is prednisolone.

17. A method in accordance with claim 5 wherein the compound of the quinonoid structure is p-benzoquinone and the $\Delta^{1,4}$-3-one steroid is prednisolone.

18. A method in accordance with claim 5 wherein the compound of the quinonoid structure is phenazine methosulfate and the $\Delta^{1,4}$-3-one steroid is $\Delta^1$-androstenedione.

19. A method in accordance with claim 2 wherein the compound containing chromium is chromic nitrate and the $\Delta^{1,4}$-3-one steroid is prednisolone.

20. A method in accordance with claim 2 wherein the compound containing molybdenum is phosphomolybdic acid and the $\Delta^{1,4}$-3-one steroid is prednisolone.

References Cited in the file of this patent
UNITED STATES PATENTS
2,880,205    Campbell et al. _____ Mar. 31, 1959

OTHER REFERENCES

Prescott et al.: Industrial Microbiology, McGraw-Hill Book Company, Inc., New York, 1959, page 749.